United States Patent

Stelle

[11] 3,755,078
[45] Aug. 28, 1973

[54] SEGMENTED HYDRAULIC CORE CLAMP
[75] Inventor: Allen M. Stelle, Calabasas, Calif.
[73] Assignee: North American Rockwell Corporation, Pittsburgh, Pa.
[22] Filed: Dec. 27, 1971
[21] Appl. No.: 211,900

[52] U.S. Cl. .................................. 176/87, 176/85
[51] Int. Cl. ............................................. G21c
[58] Field of Search .................... 176/85, 87, 40

[56] References Cited
UNITED STATES PATENTS

| | | | |
|---|---|---|---|
| 3,682,774 | 8/1972 | Beyer | 176/85 X |
| 3,260,650 | 7/1966 | Kalk et al. | 176/85 X |
| 2,998,370 | 8/1961 | Gaunt et al. | 176/85 |
| 3,100,188 | 8/1963 | Fraas et al. | 176/85 |
| 3,287,225 | 11/1966 | Ackroyd et al. | 176/40 |

FOREIGN PATENTS OR APPLICATIONS

| | | | |
|---|---|---|---|
| 916,144 | 1/1963 | Great Britain | 176/85 |
| 608,057 | 9/1960 | Italy | 176/85 |

Primary Examiner—Carl D. Quarforth
Assistant Examiner—Roger S. Gaither
Attorney—L. Lee Humphries, Thomas S. MacDonald and Robert G. Upton et al.

[57] ABSTRACT

A clamping device for nuclear reactor cores wherein a plurality of hydraulic cylinders act directly to open or close a tilting segment core clamp, the clamp exerting a radial inwardly directed force of constant magnitude on the reactor core yet is releasable upon reversing the direction of fluid on a piston within the hydraulic cylinders thereby releasing the fuel elements within the core.

10 Claims, 6 Drawing Figures

INVENTOR.
ALLEN M. STELLE

BY Robert G. Upton

AGENT

INVENTOR.
ALLEN M. STELLE

BY Robert G. Upton

AGENT

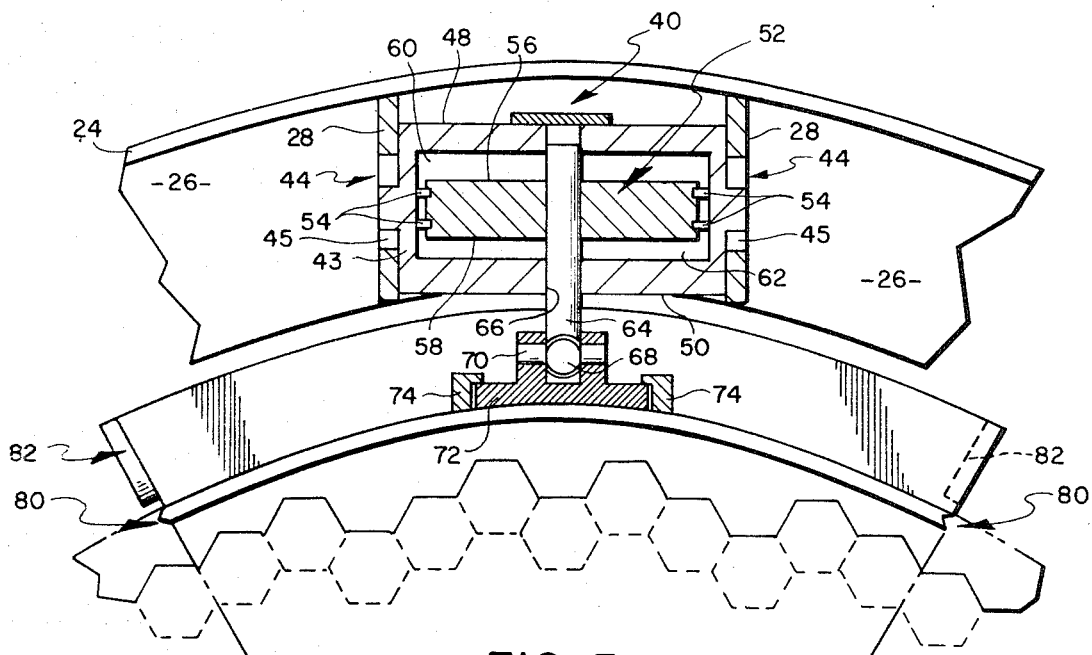
FIG. 3
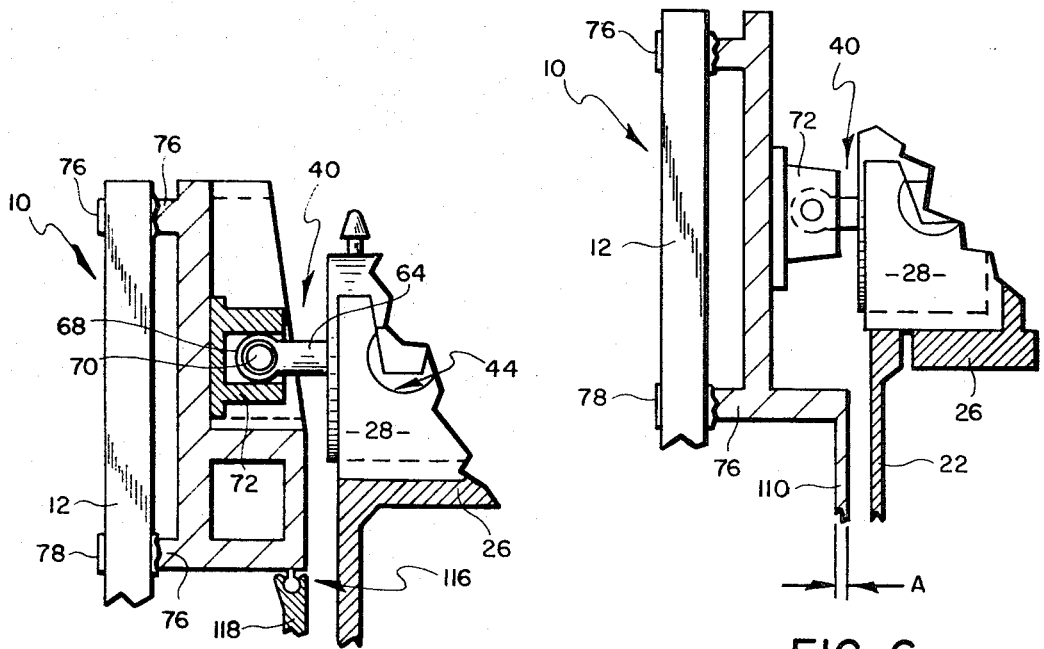
FIG. 5
FIG. 6
INVENTOR.
ALLEN M. STELLE
BY Robert G. Upton
AGENT

SEGMENTED HYDRAULIC CORE CLAMP

BACKGROUND OF THE INVENTION

1. Field of the Invention

This invention relates to the field of nuclear reactors and more particularly to methods and means for maintaining structural integrity within the core region of nuclear reactors. Still further, this invention relates to methods and means for clamping the cores of nuclear reactors.

In the operation of nuclear reactors, a temperature gradient is built up within the core region with the highest temperature at the center of the core. Fuel elements placed within the gradient tend to bend convexly away from the center of the core because the hot side of the fuel element expands to a greater extent than the cooler side. This action known as thermal bowing has detrimental effects on core geometry coolant flow and control of the nuclear reaction. Another factor which must be considered in the design of nuclear reactor cores, especially in cores designed for elevated neutron effluences is the swelling of the structural materials subjected to fast radiation. Experiments have shown that structural materials such as austenitic stainless steel develop internal voids under fast neutron radiation which are responsible for the swelling observed. The swelling of core components creates expansion pressures within the core compounding the detrimental effects of thermal expansion in a similar outwardly direction. Other possible disruptions of core integrity involve displacements due to stress relaxation and vibrations caused by the flow of coolant in the core. Since the maintenance of structural integrity within the core of nuclear reactors is vital, there is great need for methods and means for achieving integrity in all operating conditions.

2. Description of the Prior Art

Various core clamping systems have been proposed whereby an external force is exerted on the core of the reactor to assure constant geometry. Many of these proposals involve the use of core expansion energy to create a clamping force. While expansion energy is an efficient source of clamping force, control of such forces is most difficult. It is not possible, for example, to turn off the clamping force in a hot reactor or one in which the expansion force used creates clamping force caused by a neutron-induced swelling. Yet, relief of clamping forces is necessary for fuel handling, for example, during refueling operations.

An example of a core clamping system in the prior art is U.S. Pat. No. 3,215,608. This patent discloses a plurality of twist rods surrounding a reactor core. The twist rods have cams at their opposite ends that are biased by the spring action of the twisted rods to resist or restrain the expansion energy of the elements in the reaction core. The more the cam expands the greater the force the twist rods exert against the core.

Another example is disclosed in U.S. Pat. No. 3,100,188. The invention utilizes a series of individual hoops with their axis aligned parallel to the fuel elements that surround the fuel elements on a horizontal plane. The spring action of the hoops surrounding the core resists thermal growth of the reactor during operation.

Other patents in the prior art utilize the expansion force of the reactor to create a clamping force as described above. The present invention has an advantage over the prior art in that an independent core clamping means separate from the expansion energy of the core element is utilized.

SUMMARY OF THE INVENTION

A novel means is disclosed for maintaining the integrity of nuclear reactor cores using a multiplicity of particularly tilting leaves that are gang operated by six mutually interconnecting hydraulic cylinders, each leaf spanning one-sixth of the core perimeter to act perpendicular to flats provided in the core assemblies. To close the clamp, liquid sodium is directed to the rear faces of the pistons within the cylinders which causes the cylinders to compress their loads on the leaves and to substantially simultaneously move inward against the reflector elements rotating the leaves about their lower pivots. The clamps remain bearing against the core assemblies as long as the pressure is maintained within the cylinders. Reversing the pressure to the other side of the pistons in the cylinders causes the leaves to substantially simultaneously move out to open the clamp.

Accordingly, it is an object of this invention to provide a nuclear reactor core clamp that provides constant pressure and yet is releasable to allow maintenance of the core body.

More particularly, it is an object of this invention to provide a plurality of hydraulic cylinders connected to tilting leaves that surround the core clamp, the hydraulic cylinders acting together to provide either a clamping force on the core body or simultaneously released to open the clamp so as to provide access for maintenance of the core.

Since the actuator cylinders are all connected to a common pressure source, their simultaneous motion is transferred through an interconnector. The interconnection is provided by a series of vertical and horizontal chevron joints, the depth of the chevron being adjusted by its included angle so that it does not become disengaged during the normal stroke of the clamp segment. As the segments rotate in and out the chevrons progressively engage or disengage from bottom to top or top to bottom, respectively. The horizontal section of the chevron joints keep the horizontal planes of the segment matched so that the fully engaged clamp is a truly vertical right circular cylinder and is not cocked to one side or the other by the urging of the strongest piston within the hydraulic actuators.

Accordingly, an advantage over the prior art is to uniformly engage or clamp the core of the nuclear reactor to impose a radial uniform pressure on the core body so as to restrain the core during a swelling of the individual rods. The segmented clamp has the additional advantage of being retractable so as to provide access for maintenance of the core body.

The above noted objects and advantages of the present invention will be more fully understood on a study of the following detailed description in conjunction with the detailed drawings in which:

BRIEF DESCRIPTION OF THE DRAWINGS

FIG. 3 is a view looking down through lines 3—3 of FIG. 2 illustrating the various components within the cylinder including the piston, piston ring, rod, etc.;

FIG. 5 is a partial sectional view of another embodiment of the invention; and

FIG. 6 is a cross-sectional view partially broken away of still another embodiment of the invention.

DESCRIPTION OF THE PREFERRED EMBODIMENTS

Figure 1:
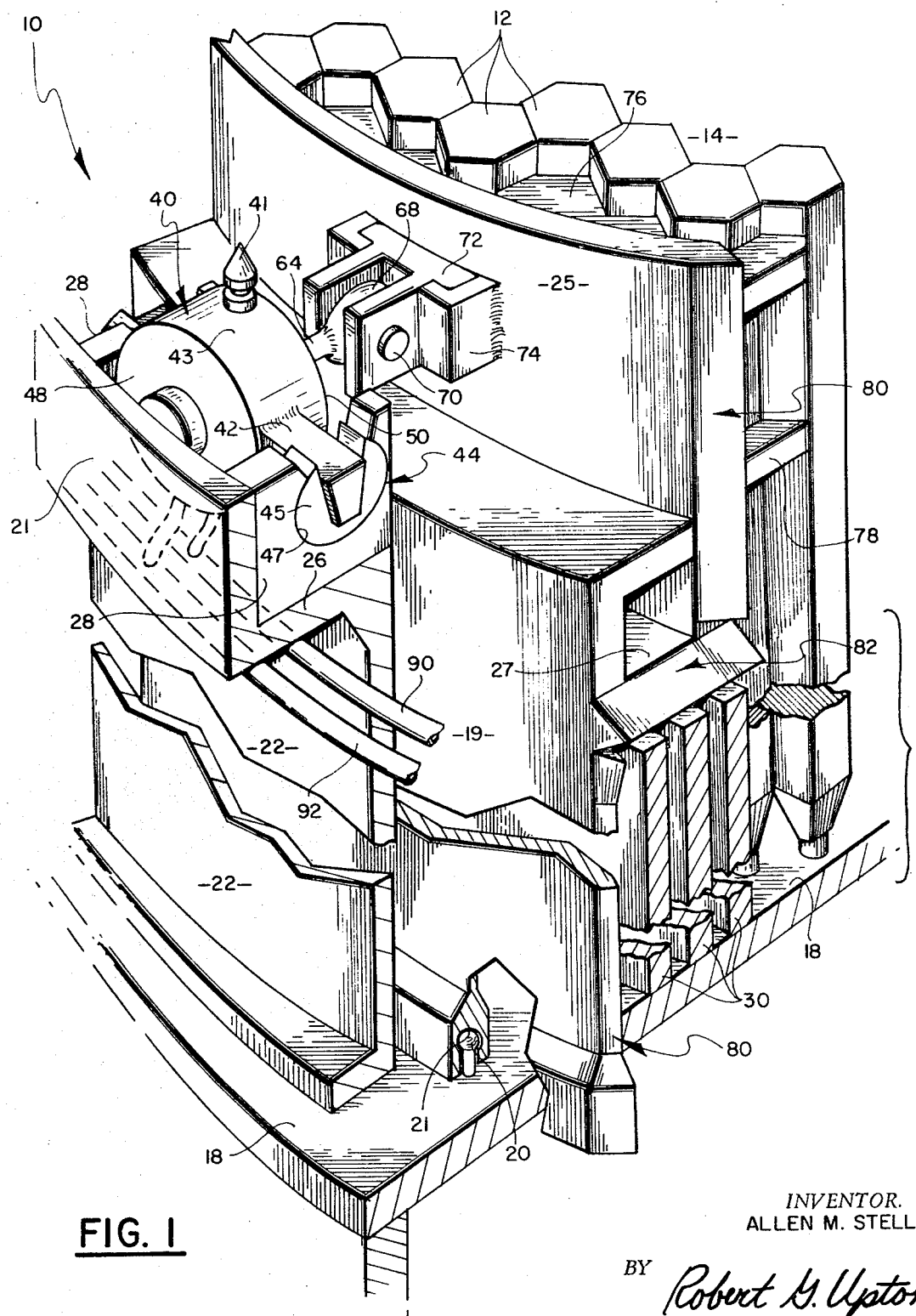
FIG. 1 is a partially cutaway perspective view illustrating the core clamp including the hydraulic cylinder and pressure foot.

Referring now to FIG. 1, the tilting clamp segment generally designated as 10 is one of preferably six segments making up 360° of core clamps surrounding a core 14 of a nuclear reactor. Surrounding the core 14 is a plurality of reflector elements 12 that restrain the fuel elements within the core 14. A key element within the clamp segment 10, making up one-sixth of all the segments surrounding the reactor, is a tilting support member generally designated as 16. The support member or clamp segment 16 is hinged at its base 17 to a top grid plate 18. Extending from the top grid plate 18 is a pair of pivot members 20 (only one is illustrated). The pivot or hinge basically is a ball socket which interfits within a seat 21 in base 17 of clamp wall segment 19. It can be seen that the tilting clamp member 16 rotates about at least a pair of hinges 20 in each of the tilting clamp segments 10. The tilting segments are movable radially inwardly or outwardly by pivoting about the hinges 20 in each of the segments 16. Surrounding the inner concentric segments 16 is an outer support structure 22 which substantially parallels the walls of the clamp segment 16. support structure 22 is preferably cylindrical and is mounted at its base 23 to or with respect to the top grid plate 18. A ledge 26 extends outwardly from the support member 22 above base 23 to form a support for a retainer ring 24. Ring 24 extends parallel to both the tilting segment 16 and the support 22 forming a parallel annuli cylinder therewith. Ledge 26 provides a base for the hydraulic cylinders generally designated as 40, one cylinder for each clamp segment around a 360° circumference. The hydraulic cylinder 40 is mounted through a trunnion assembly generally designated as 44. The trunnion comprises a pair of bearings 45, movable in bearing races 47. The trunnions are supported by wall members 28 on either side of the hydraulic cylinder 40. A trunnion pin 46 rests in a pin recess in wall member 28 and extends into a slot 49 in bearing 45. The slot permits a limited amount of rotation of the bearing in race 47. Attached to either side of the hydraulic cylinder 40 is a pair of support arms 42 of key-stone cross-section terminating within the trunnion members 44. The support arms 42 nest within the trunnion assembly 44 by gravity. Piston rod member 64 extends through wall 50 of hydraulic cylinder 40, terminating in a rod bearing 68. The rod bearing 68 is supported by a pressure foot 72 by a pin 70 through the pressure foot wall. The pressure foot is retained in a sliding fit by retainer 74 which is affixed to the upper wall 25 of the tilting clamp segment 16 and which prevents fall through of the foot 72. The outer peripheral surfaces of the foot and the inner surface of the retainer may be complimentarily tapered for ease of assembly and disassembly. The pressure foot 72 is equidistantly spaced between a pair of clamp segment restraints or pads 76 and 78 connected to the inner wall 25 and meshed with the reflector assembly elements 12. The clamp segment restraints are directed radially inwardly against the reflector assembly 12. Hence, the pressure foot applies pressure equally to each of the clamp segment restraints 76 and 78 so as to cause an even pressure differential onto the reflector assembly 12 pressing against the individual reactor elements of core 14. The pressure pads 76 and 78 are positioned against the reflector elements 12 on a horizontal plane at approximately the center of the reactor. The pair of pads 76, 78 provide a stabilizing restraint against reactor fluences which tend to distort or bow the elements 14. The pads 76, 78 are so positioned to hold the elements 14 vertically straight above and below the pads.

A series of neutron shields 30 are concentrically spaced apart and surround the reflecting assembly 12 inside of the tilting clamp segments 16.

Each of the clamp segments 16 surrounding the reactor core are intermeshed along their vertically extending edges through, for example, a chevron seal 80. The chevron seal is essentially a "V" interfitted within a "V" so that as the male "V" is moved away from or into the complementary female "V," receptacle, the segments stay aligned, one with the other. Additionally, there are horizontally extending chevron clamps 82 which conform to horizontally or radially extending ledge 27 above the neutron shields 30. Therefore, as the clamp segments move radially inwardly or radially outwardly, the chevron clamps serve to keep each segment in vertical and horizontal alignment, one with the other, as long as the movement is restrained within the limits of the "V" female receptacle.

A pair of liquid sodium transfer lines 90 and 92 which may be interconnected to the reactor coolant system are disposed circumferentially about the outer support member 42 below the hydraulic cylinder support ledge 26. The hydraulic conduits 90 and 92 serve to direct, for example, liquid sodium from the reactor coolant system (not shown) into and out of the hydraulic cylinder tilting clamp segment actuator 40 so as to cause a piston and its rod to move within the cylinder to, in turn, either move the pressure foot 72 into or out of engagement with the reflector assembly 12. Liquid sodium is an ideal hydraulic fluid to actuate cylinder 40 since the liquid sodium is already under pressure during reactor operation. Other fluids are unsuitable due to the high temperature environment as well as the incompatability of the fluid with the liquid sodium in the reactor system. An advantage is realized when using liquid sodium from the reactor coolant system in that, if the reactor should malfunction and liquid sodium pressure is lost the core clamp segments would immediately open up thus providing a fail safe system. Additionally, any leakage of liquid sodium from the cylinders and attendant pipe connections merely leaks sodium into sodium thereby obviating any problems of incompatability.

Figure 2:
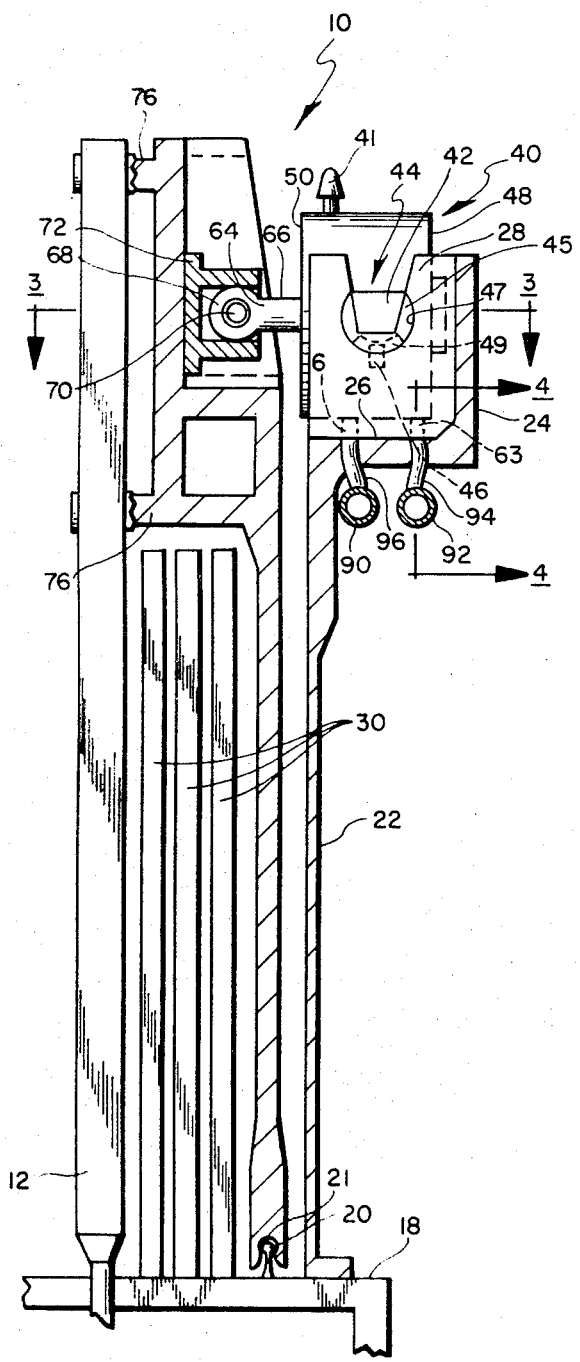
FIG. 2 is a cutaway side elevational view of the preferred embodiment taken through lines 2—2 of FIG. 1.

FIG. 2 more clearly illustrates the tilting segment 10, including the movable segment member 16 pivotably connected to the top grid plate 18 through hinges 20. The outer concentric rigid support member 22, supporting the hydraulic cylinder 40, provides a rigid base for the hydraulic cylinders for each of the movable segments 16. The outer ring 24 connected to support member 22 provides a strong back-up structure for each of the hydraulic cylinders 40 associated with each of the six tilting clamp segments 10. During operation, liquid sodium is directed into conduit 92 which supplies liquid to the back side of the piston within hydraulic cylinder 40, causing the piston rod 64 to exert a pressure through rod bearing 68 supported on the pin 70 which transfers the pressure through the pressure foot 72 against the inner side of the clamp segment 25; the pressure then is transferred to the clamp segment restraints 76 and 78 pressing against the reflector assembly 12. When pressure is applied through conduit 90 to the front side of the piston, the rod is caused to retract into the hydraulic cylinder 40, causing the pressure foot 72 to pull away from engagement with the reflector assembly 12, thus positively releasing the reactor core elements 14 for maintenance purposes or the like.

Turning now to FIG. 3, a cross-section through the hydraulic cylinder 40 reveals the piston 52 disposed within cylinder 40. A pair of chambers are defined within the cylinder 40, the first chamber 60 being formed between the backside of the piston 56 and wall 48, while chamber 62 is formed by the front side of the piston 58 and wall 50. Piston rod 64 is rigidly connected to piston 52 and extends through the piston into a recessed bearing support 59, thereby providing a bearing for the opposite end of the piston rod. Rod 64 extends through aperture 66 in wall 50, terminating in rod bearing end 68 which is connected to pressure foot 72 through pin 70. Pressure foot 72 is restrained by retainer 74 which is rigidly bonded as by welding to tilting segment wall member 25. The piston 52 has at least a pair of conventional type piston rings 54 to seal chamber 60 and 62, one from the other. The whole hydraulic cylinder assembly rests on the trunnion 44 in wall member 28. Both edges of tilting segment 16 have vertically and horizontally oriented chevron sealed joints 80 and 82 so that each chevron joint fits one with the other as previously described.

Figure 4:
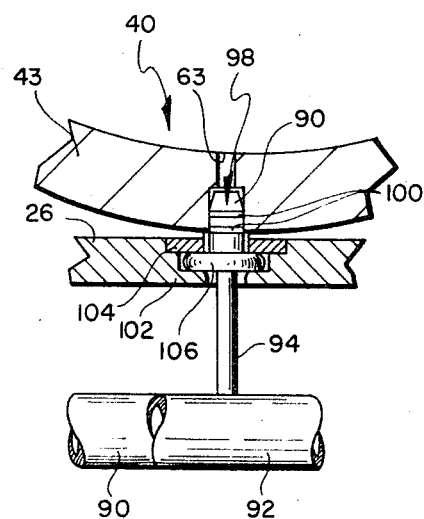
FIG. 4 is a partially cutaway sectional view taken through lines 4—4 of FIG. 2.

Turning now to FIG. 4, the hydraulic connections are illustrated which interconnect each hydraulic cylinder 40 with the liquid sodium feed system consisting of pipes 90 and 92. For example, the feed pipe 92 has an interconnecting conduit 94 which extends into the hydraulic cylinder 40 through plug 98. Conduit 94 has a flange 106 which rests within a recess 103 in ledge 26, the conduit 94 being retained within recess 103 by a nut lock 104. The male plug end 98, rigidly connected to conduit 94, has at least a pair of piston type rings 100 which provide a seal in aperture 63 in wall 43 through hydraulic cylinder 40. An enlarged recess 105 in cylinder wall 43, communicating with apertures 63, is designed to accept male plug 99 of the plug end type joint 98. A similar type of plug-in joint is associated with conduit 96 leading to the chamber 62 on the other side of piston 52 (not shown).

Referring to both FIGS. 1 and 2, the hydraulic cylinder 40 has connected to its top surface a tilting segment pickup fitting 41 which is designed to accept a grapple (not shown) so that the hydraulic cylinder can be removed from the reactor core. The quick disconnect plugs are necessary due to the grapple type of hydraulic cylinder removal technique employed to service the hydraulic cylinder assembly. To remove a defective cylinder, the liquid sodium flow is shut off to the cylinder and the trunnion locks 46 removed. The grapple simply engages the pickup fitting 41 and the cylinder is then lifted off the male plug type members 98, thus simplifying the entire operation. Pressure shoe 72 slips or slides out of retainers 74 when the grapple lifts cylinder 40 out of its mount. When the cylinder is placed back in the system, the male plugs are merely lined up with recessed member 105 in each of the cylinders and are pressed over the male fittings, thus reconnecting the hydraulic joints to sodium feed pipes 90 and 92.

In operation, then, if a force is desired to cause the clamp segments 10 to press radially inwardly on the reflector assemblies 12, the liquid sodium is directed to conduit 92 under pressure of, for example, 175 psig. Hydraulic pressure within chamber 60 causes piston 52 to translate radially inwardly, applying a pressure through rod 64 onto pressure foot 72 which distributes pressure onto each of the clamp segment restraints 76 and 78, pressing against reflector assembly 12. Each tilting segment moves inwardly, for example, approximately 0.500 inch, which applies a force of approximately 65,000 lbs. onto the reflector elements 12 surrounding the core body element members 14. The pressure within the cylinders is approximately 175 lbs. per square inch maximum at approximately 50 gallons per minute of sodium flow. If it is desired to retract the six tilting clamp segments from the reflector assembly 12, then pressure is redirected to flow conduit manifold 90 which directs liquid under pressure through conduit 96 into chamber 62, thereby forcing piston 52 radially outwardly, releasing the pressure from the reflector assembly 12.

As the piston forces the clamp segment 16 radially inwardly, the clamp retainers 76, 78 opposite wall section 25 can tilt so that the clamp segment restraints 76, 78 apply an uneven pressure against reflector assembly 12. For example, the top clamp segment restraint pad 76 may be applying more pressure than the bottom clamp segment restraint pad 78 because of the rigid nature of the tilting clamp segment 16 along a vertical plane from hinge 20 up through the upper clamp wall section 25. Therefore, a means may be provided to compensate for this uneven pressure distribution on the reflector assembly 12.

FIG. 5 discloses a means to apply an even, radially directed pressure to the clamp segment restraint pad members 76, 78 pressing against reflector assembly 12. FIG. 5 discloses at least a pair of upper hinges 116 positioned in wall 10 of tilting segment 16 between the lower clamp pivot 20 and the clamp segment wall member 25. As the piston 52 forces the clamp segment inwardly, the tilting member 19, between hinges 20 and 166, tilts inwardly yet allows the upper segments containing the retainer members 76 and 78 to remain on a vertical plane opposite the reflector assembly regardless of the inward direction of each tilting clamp segment 10. The hinge 116 allows for any misalignment of the reflector assembly regardless of whether they are oriented vertically or off of the vertical orientation.

Turning now to FIG. 6, still another embodiment is disclosed wherein the vertical section 19 of the tilting clamp segment 16 is a cross section, as is indicated by dimension "A" of the drawing. The thin section accommodates for any misalignment of the vertical reflector assembly 12 by physically distorting to compensate for misalignment. Thus, as the piston 52 forces the clamp segment radially inwardly against the reflector 12, the thin wall section 19 bends and distorts to accommodate for any vertical misalignment of the pad 76, 78 against the reflector element 12.

I claim:

1. A clamping system for a nuclear reactor core having a cluster of vertically aligned fuel elements, including a row of peripheral reflector elements comprising:
   vertically aligned support means spaced from and surrounding said reflector elements, said support means being fixedly mounted with respect to a base within said core,
   a plurality of segmented core clamping means concentrically positioned between said support means and said reflector elements, said segmented core clamping means being substantially vertically aligned with said reflector elements and pivotably mounted with respect to said base in said core at a lower end, and means, radially outward of said clamping means and fixed with respect to said support means, disposed adjacent to the upper end of said clamping means to direct a force on a horizontal plane radially inwardly against said reflector elements.

2. The invention as set forth in claim 1 wherein said means disposed at said upper end of said clamping means is a plurality of hydraulic cylinders connected between said support means and each of said plurality of segmented clamping means.

3. The invention as set forth in claim 2 further comprising;
   a source of liquid under pressure connected to each of said hydraulic cylinders to cause said cylinders to apply pressure radially inwardly against said reflector elements surrounding said cluster of vertically aligned fuel elements.

4. The invention as set forth in claim 3 wherein said source of liquid to said hydraulic cylinders is liquid sodium from the coolant system of said nuclear reactor.

5. The invention as set forth in claim 4 further comprising:
   a plurality of radially extending pressure pads connected to each of said pivotably mounted segmented core clamping means at said upper end, said pressure pads being fixed on the inwardly facing side of said segmented core clamping means in abutting contact with said reflector elements, said plurality of pressure pads being disposed in horizontal planes above and below a pressure foot attached on the outwardly facing side of said segmented core clamping means at said upper end, said pressure foot being connected between a hydraulic cylinder and said segmented core clamping means.

6. The invention as set forth in claim 5 further comprising;
   means to compensate for uneven pressure to said plurality of pressure pads abutting said reflector elements when said clamping system applies a radially inwardly directed pressure against said cluster of vertically aligned elements, said pressure means ans comprising a hinge in said segmented clamping means located on a horizontal plane below said abutting pressure pads, said hinge serving to maintain said pressure pads parallel to said reflector elements despite vertical misalignment of said pivotably mounted segmented core clamping means.

7. The invention as set forth in claim 6 wherein said means to compensate for uneven pressure to said plurality of pressure pads abutting said reflector elements is a reduced cross-section of material in said segmented core clamping means, said reduced cross-section being positioned on a horizontal plane below said plurality of pressure pads, the segmented core clamping means being distortable below said plurality of pressure pads when said segmented core clamping means becomes vertically misaligned, thus maintaining equal pressure against the reflector elements.

8. The invention as set forth in claim 1 wherein said plurality of core clamping segments interfit along their peripheral edges within a seal to maintain alignment one with the other, said seal being a V-shaped male member interfitted within a complementary female receptacle.

9. A clamping system for a nuclear reactor core having a cluster of vertically aligned elements, including a row of peripheral reflector elements comprising:
   vertically aligned support means spaced from and surrounding said reflector elements, said support means being mounted to a base within said core,
   a plurality of segmented core clamping means concentrically positioned between said support means and said reflector elements, said segmented core clamping means being substantially vertically aligned with said reflector elements, and pivotably mounted to said base in said core at a first end and means disposed at the other end spaced from said first end to direct a force on a horizontal plane radially inwardly against said reflector elements, said means to direct a force radially inwardly comprising a plurality of hydraulic cylinders connected between said support means and each of said plurality of segmented clamping means at said other end of said segmented clamp, and
   a source of liquid sodium from said nuclear reactor under pressure being directed to each of said hydraulic cylinders to cause said cylinders to apply pressure radially inwardly against said reflector elements surrounding said cluster.

10. The invention as set forth in claim 9 wherein said liquid sodium under pressure is directed to said hydraulic cylinders to apply pressure radially outwardly to release the pressure against said reflector elements surrounding said cluster.

* * * * *

UNITED STATES PATENT AND TRADEMARK OFFICE
CERTIFICATE OF CORRECTION

PATENT NO. : 3,755,078
DATED : August 28, 1973
INVENTOR(S) : Allen M. Stelle

It is certified that error appears in the above-identified patent and that said Letters Patent are hereby corrected as shown below:

Column 8, lines 1 and 2, change "pressure means ans" to read --pressure compensating means--.

Signed and Sealed this

Tenth Day of August 1976

[SEAL]

Attest:

RUTH C. MASON
*Attesting Officer*

C. MARSHALL DANN
*Commissioner of Patents and Trademarks*